(12) United States Patent
Yamamoto

(10) Patent No.: US 8,839,979 B2
(45) Date of Patent: Sep. 23, 2014

(54) TANK AND TANK MANUFACTURING METHOD

(75) Inventor: Yoshinori Yamamoto, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 998 days.

(21) Appl. No.: 12/905,166

(22) Filed: Oct. 15, 2010

(65) Prior Publication Data

US 2011/0089181 A1    Apr. 21, 2011

(30) Foreign Application Priority Data

Oct. 19, 2009    (JP) ................................. 2009-240011

(51) Int. Cl.
  *B65D 53/00* (2006.01)
  *F17C 1/00* (2006.01)
  *B65D 53/02* (2006.01)

(52) U.S. Cl.
  CPC ........... *F17C 1/00* (2013.01); *F17C 2203/0604* (2013.01); *F17C 2203/0619* (2013.01); *F17C 2201/0109* (2013.01); *B65D 53/02* (2013.01); *F17C 2205/0397* (2013.01); *Y02E 60/321* (2013.01); *F17C 2221/012* (2013.01); *F17C 2203/0673* (2013.01); *F17C 2201/035* (2013.01); *F17C 2209/2118* (2013.01); *F17C 2223/0123* (2013.01); *F17C 2260/036* (2013.01); *F17C 2205/0305* (2013.01)
  USPC .......... 220/378; 220/601; 220/581; 220/62.22

(58) Field of Classification Search
  USPC ........... 220/601, 592, 581, 586, 62.11, 62.22, 220/226, 228, 304, 795, 803; 222/13, 3; 53/403, 79; 29/527.1
  See application file for complete search history.

(56) References Cited

U.S. PATENT DOCUMENTS

| 2,064,435 | A |   | 12/1936 | Loeffler |
| 2,622,949 | A |   | 12/1952 | Crotchett |
| 4,343,565 | A |   | 8/1982 | Hallerback |
| 5,195,774 | A | * | 3/1993 | Morita ........................... 280/731 |
| 5,909,818 | A | * | 6/1999 | Bateman ....................... 220/601 |

(Continued)

FOREIGN PATENT DOCUMENTS

| JP | 55-100405 | 7/1980 |
| JP | 7-310895 | 11/1995 |

(Continued)

OTHER PUBLICATIONS

Notification of First Office Action for Chinese Appl. No. 201010515772 dated Sep. 2, 2011.

(Continued)

*Primary Examiner* — Robert J Hicks
*Assistant Examiner* — Kareen Rush
(74) *Attorney, Agent, or Firm* — Finnegan, Henderson, Farabow, Garrett & Dunner, LLP

(57) ABSTRACT

The present invention provides a tank including an O-ring 34 between a cylindrical mouth portion 18, which is formed in a resin liner 12 forming a tank body which is to be filled with gas, and a ferrule member 20 which is mounted on an inner peripheral side of the mouth portion 18. An insert ring 36 which is insert-molded at the time of molding the resin liner 12 is provided within the mouth portion 18. The insert ring 36 includes a plurality of communication holes 38 which communicate between the inner peripheral side and an outer peripheral side thereof.

4 Claims, 2 Drawing Sheets

(56) References Cited

U.S. PATENT DOCUMENTS

2007/0111579 A1    5/2007   Ishimaru
2008/0047963 A1*   2/2008   Wilson et al. .................. 220/582
2009/0071965 A1*   3/2009   Iida et al. ...................... 220/586
2009/0277655 A1*   11/2009  DeCourcy et al. .............. 169/45

FOREIGN PATENT DOCUMENTS

| | | |
|---|---|---|
| JP | 2002-347081 | 12/2002 |
| JP | 2005-48919  | 2/2005  |
| JP | 2008-175341 | 7/2008  |
| JP | 2008-303966 | 12/2008 |

OTHER PUBLICATIONS

Notice of Grounds for Rejection for JP Appl. No. 2009-240011 dated Aug. 30, 2011.

* cited by examiner

TANK AND TANK MANUFACTURING METHOD

PRIORITY INFORMATION

This application claims priority to Japanese Patent Application No. 2009-240011, filed on Oct. 19, 2009, which is incorporated herein by reference in its entirety.

TECHNICAL FIELD

The present invention relates to technology of a high-pressure tank.

BACKGROUND ART

In high-pressure tanks which are to be charged with gas such as hydrogen, gas tightness is important. Concerning this type of gas tank, there is known, as technology for establishing a seal between a mouth portion formed on a resin liner forming a tank body and a ferrule member fitted on the inner peripheral side of the mouth portion, technology in which an O-ring is mounted in a groove portion formed on the liner and an insert ring is provided on the outer periphery of the liner for clamping the O-ring in the radially inward direction, thereby establishing a seal between the mouth portion and the ferrule member. (See JP 2008-303966 A, for example).

Further, there is also known, as technology for establishing a seal between the mouth portion and the ferrule member, technology in which an O-ring is mounted in a groove portion formed on the outer periphery of a ferrule member and an insert-ring (backup ring) is insert-molded within a liner to thereby establish a seal between the mouth portion and the ferrule member. (See JP 2005-48919 A)

However, with regard to the insert ring which is used for the tank described in JP 2008-303966 A, there is a problem that there are cases in which, at the time of molding the liner, the volume of a resin (charging quantity) charging the inner peripheral side of the insert ring differs from the volume of a resin (charging quantity) charging the outer peripheral side of the insert ring, and consequently the insert ring is fixed in a displaced (off-center) state with respect to the center axis of the cylindrical mouth portion.

Further, with regard to the tank described in JP 2005-48919 A, when there is a difference in dimension between the liner mold die and the insert ring, the insert ring is fixed in a displaced (off-center) state with respect to the center axis of the cylindrical mouth portion by resin flowing at the time of the liner molding.

When the insert ring is fixed in an off-center state as described above, the thickness of the resin provided between the insert ring and the mouth portion becomes non-uniform (in the circumferential direction).

Further, when the thickness of the resin provided between the insert ring and the mouth portion is non-uniform, the liner (mainly the mouth portion) is deformed due to a reaction force of the O-ring, thereby preventing securing of sufficient sealability between the mouth portion and the ferrule member.

SUMMARY

It is therefore an advantage of the present invention to provide a tank and a method of manufacturing a tank in which an insert ring is prevented from being fixed in an off-center state due to flow of resin at the time of molding a liner to thereby allow securing of sufficient sealability between a mouth portion and a ferrule member.

In accordance with an aspect of the invention, there is provided a tank including an O-ring between a cylindrical mouth portion which is formed in a resin liner forming a tank body which is to be filled with gas and a ferrule member which is mounted on an inner peripheral side of the mouth portion, wherein an insert ring which is insert-molded at the time of molding the resin liner is provided within the mouth portion, the insert ring including a plurality of communication holes which communicate between the inner peripheral side and an outer peripheral side of the insert ring.

In accordance with another aspect of the invention, there is provided a method of manufacturing a tank including an O-ring between a cylindrical mouth portion which is formed in a resin liner forming a tank body which is to be filled with gas, and a ferrule member which is mounted on an inner peripheral side of the mouth portion, including insert-molding an insert ring within the mouth portion at the time of molding the resin liner, the insert ring including a plurality of communication holes which communicate between the inner peripheral side and an outer peripheral side of the insert ring. By providing the communication holes, it is easy to equalize the charging quantity of resin with respect to the inner peripheral side and the outer peripheral side of the insert ring at the time of molding a resin liner. When the uniform charging quantity of resin hardens at a substantially uniform thickness along the circumferential direction, the insert ring is fixed at substantially the center portion with respect to the center axis of the cylindrical mouth portion. Consequently, sufficient sealability can be ensured between the mouth portion and the ferrule member.

According to the present invention, it is possible to provide a tank and a method of manufacturing a tank in which an insert ring is prevented from being fixed in an off-center state due to flow of resin at the time of molding a liner, to thereby allow securing of sufficient sealability between a mouth portion and a ferrule member.

BRIEF DESCRIPTION OF THE DRAWINGS

A preferred embodiment of the present invention will be described in detail based on the following figures, wherein.

DESCRIPTION OF EMBODIMENTS

A preferred embodiment of the present invention will be described in detail with reference to the accompanying drawings.

Figure 1:
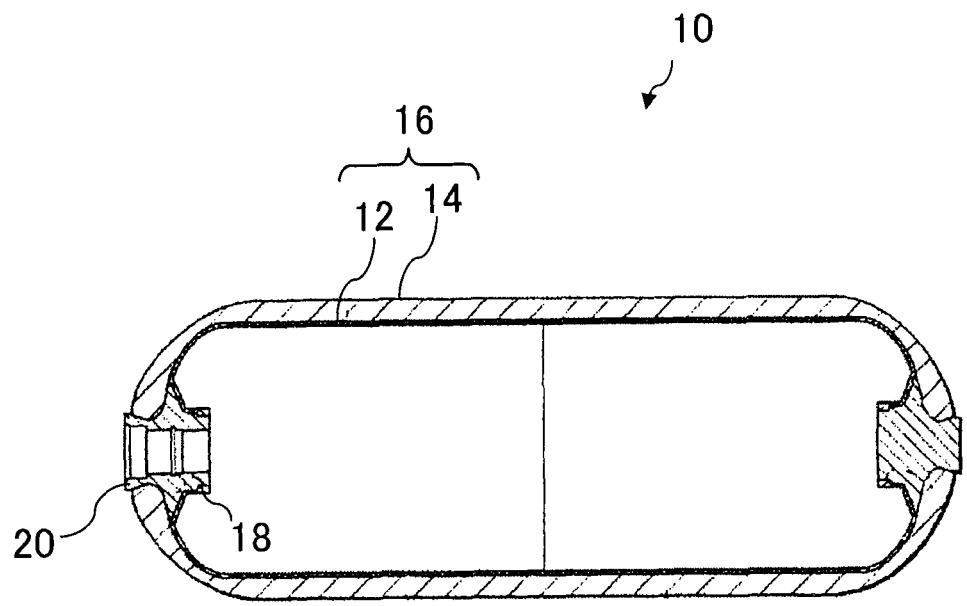
FIG. 1 is a cross sectional view schematically illustrating an example structure of a tank according to an embodiment of the present invention.

FIG. 1 is a cross sectional view schematically illustrating an example structure of a tank according to the present embodiment. A tank 10 illustrated in FIG. 1 is to be charged with high pressure gas and store the high pressure gas therein, and includes a tank body 16 which is formed of a liner 12 made of a resin or a resin liner (a mounting subject) and a fiber reinforced resin layer 14 which is formed of a glass fiber, a carbon fiber, and so on and which covers the outer peripheral side of the resin liner 12.

At each end of the tank body 16, a ferrule member 20 is mounted on a mouth portion 18 formed on the resin liner 12. Here, the side of the tank body 16 having the ferrule member 20 to which a valve can be attached is referred to as a valve side, and the opposite side is referred to as an end side.

Figure 2:
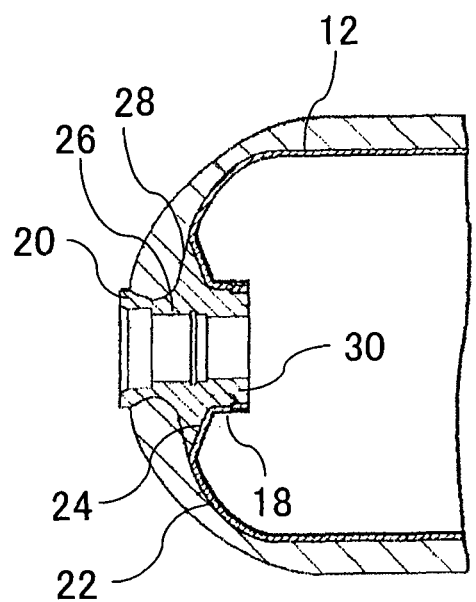
FIG. 2 is a cross sectional view schematically illustrating an example structure of a portion in which a ferrule member is mounted onto a liner according to the present embodiment.

FIG. 2 is a cross sectional view schematically illustrating one example structure of a portion in which the ferrule member is mounted onto the resin liner according to the present embodiment. In the illustrated example, the structure on the valve side will be described. As illustrated in FIG. 2, an inwardly extending portion 24 which extends from the inner edge of a shoulder portion 22 of the liner 12 toward the center axis in a funnel shape, in which a section of the inwardly extending portion 24 having a smaller diameter is located on the inner side of the resin liner 12, and a cylindrical mouth portion 18 projecting from the side of the inner extending portion 24 opposite to the shoulder portion 22 toward the inside of the resin liner 12 along the axial direction of the resin liner 12, are integrally formed on the resin liner 12.

The ferrule member 20 is composed of a through hole 26 having a fixed diameter which is formed in the center portion thereof, a flange portion 28 which is formed in the middle portion on the outer periphery, and a cylindrical fitting portion 30 extending toward the inner side of the resin liner 12 with respect to the flange portion 28. The ferrule member 20 is mounted to the resin liner 12 by forcing and fitting the ferrule member 20 onto the mouth portion 18 until the flange portion 28 comes into contact with the inwardly extending portion 24.

Figure 3:
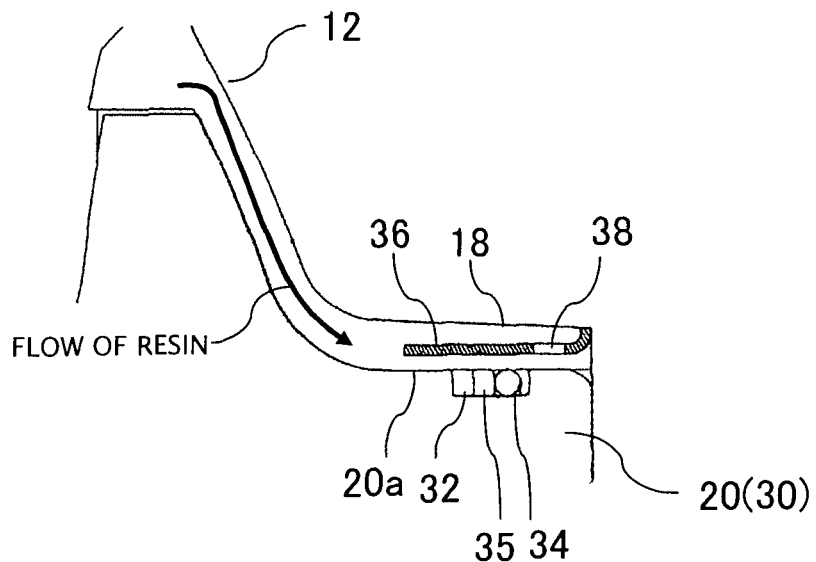
FIG. 3 is a cross sectional view schematically illustrating an example sealed state between a ferrule member and a mouth portion of a liner.

FIG. 3 is a cross sectional view illustrating an example of a sealed state between the ferrule member and the mouth portion of the resin liner according to the present embodiment. As illustrated in FIG. 3, the surface 20a of the ferrule member 20 which is opposed to the mouth portion 18 of the resin liner 12 (which substantially corresponds to the outer peripheral surface of the fitting portion 30) includes a ring groove 32 which is of an annular shape and has a rectangular cross section formed along the whole circumference of the ferrule member 20, and an annular O-ring 34 and an annular backup ring 35 serving as a sealing member are inserted in the ring groove 32.

The O-ring 34 is made of rubber (such as nitrile rubber) and has elasticity. With the O-ring 34 being sandwiched between the bottom surface of the ring groove 32 and the inner peripheral surface of the mouth portion 18 of the resin liner 12 in an elastically deformed state, sealing is established between the resin liner 12 and the ferrule member 20. This structure prevents gas stored within the tank 10 from leaking from between the resin liner 12 and the ferrule member 20. Here, the backup ring 35 serves to hold the O-ring at a fixed position, and a resin ring is generally used for this backup ring.

Further, as illustrated in FIG. 3, a cylindrical insert ring 36 is provided within the mouth portion 18 of the resin liner 12. This insert ring 36 serves to clamp the O-ring 34 toward the radially inward direction. The resin liner 12 is molded by means of injection molding of a synthetic resin such as polycarbonate, and at the time of the injection molding, the cylindrical insert ring 36 is provided within the mouth portion 18 of the resin liner 12 by insert molding.

A plurality of communication holes 38 communicating between the inner peripheral side and the outer peripheral side of the insert ring 36 are provided in the insert ring 36 of the present embodiment. Here, at the time of molding of the resin liner 12, a resin flowing toward the insert ring 36 diverges in the inner and outer peripheral directions of the ring for charging. However, without the communication holes 38, as in the insert ring 36 of the present embodiment, it is likely that the resin volume (charging quantity) would differ between the inner peripheral side and the outer peripheral side of the insert ring 36, causing the insert ring 36 to be fixed in a displaced (off-center) state with respect to the center axis of the cylindrical mouth portion 18.

In the insert ring 36 according to the present embodiment, a resin flowing toward the insert ring 36 at the time of molding of the resin liner 12 diverges in the inner and outer peripheral directions of the ring for charging, and the resin also flows in the communication holes 38, so that it is possible to reduce a difference of the resin volume (charging quantity) between the inner peripheral side and the outer peripheral side of the inert ring 36. This structure prevents the insert ring 36 from being fixed in a displaced (off-center) state with respect to the center axis of the cylindrical mouth portion 18. Consequently, as the thickness of the resin between the insert ring 36 and the ferrule member 20 can be made uniform (in the circumferential direction), it is possible to prevent deformation of the resin liner 12 (deformation of mainly the mouth portion 18) due to a reaction force of the O-ring 34, thereby allowing securing of sealability between the mouth portion 18 and the ferrule member 20.

Further, as the communication holes 38 are also charged with the resin, the insert ring 36 is firmly fixed within the mouth portion 18 of the resin liner 12.

The insert ring 36 according to the present embodiment may alternatively be machined by cutting of a metal ring, for example. However, because machining such as cutting is difficult when a metal such as stainless steel is used, machining by means of press molding is preferable. As press molding can form a member in an easier manner and is therefore more advantageous in mass productivity than machining such as cutting, cost reduction can be achieved with press molding.

Figure 4:
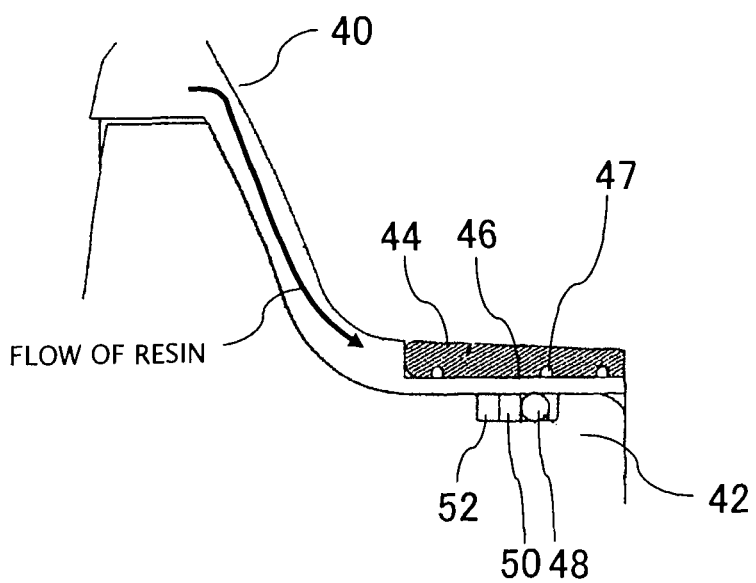
FIG. 4 is a cross sectional view schematically illustrating a sealed state between a ferrule member and a mouth portion of a liner according to prior art.

FIG. 4 is a cross sectional view schematically illustrating an example of a sealed state between a ferrule member and a resin liner in related art. As illustrated in FIG. 4, a cylindrical insert ring 44 is provided in the outer peripheral portion (on the opposite side of the ferrule member 42) of the resin liner 40. The conventional insert ring 44 is also integrally formed with the resin liner 40. In the conventional structure illustrated in FIG. 4, if there is a difference in dimensions between the mouth portion 46 of the resin liner 40 and the insert ring 44, the insert ring 44 is fixed in a displaced (off-center) state with respect to the center axis of the cylindrical mouth portion 46 due to flow of resin at the time of molding the resin liner 40. With the structure of the present embodiment in which the insert ring 44 is disposed within the resin liner 40, on the other hand, the disadvantage that the insert ring 44 is fixed in a displaced state due to a difference in dimensions as described above can be eliminated.

The conventional insert ring 44 generally includes a plurality of slots 47 formed on a surface contacting the resin liner, which are to be filled with resin, in order to prevent the insert ring 44 from being removed off the resin liner 40. Here, the structures of an O-ring 48, a backup ring 50, and a ring groove 52, and so on illustrated in FIG. 4 are similar to those of the O-ring 34, the backup ring 35, and the ring groove 32 and so on illustrated in FIG. 3, and will therefore not be described again.

Here, in order to reduce deformation of the resin liner 40 caused by a reaction force of the O-ring 48, it is generally necessary to make the thickness of the resin between the insert ring 44 and the ferrule member 42 thinner than the thickness of the resin liner 40 in other portions. Further, in order to make the thickness of the resin between the insert ring 44 and the ferrule member 42 thin, it is, in turn, necessary to design the thickness of the insert ring 44 to be thick, as illustrated in FIG. 4. This would result in a problem that it is difficult to reduce the weight of a tank.

On the other hand, as the insert ring 36 according to the present embodiment is insert-molded within the mouth portion 18 of the resin liner 12, it is possible to control the thickness of the resin between the insert ring 36 and the ferrule member 20 by changing the dimension of the inner diameter of the insert ring 36. (The thickness of the resin between the insert ring 36 and the ferrule member 20 can be reduced by reducing the dimension of inner diameter of the insert ring 36.) In other words, as it is not necessary to design the thickness of the insert ring 36 to be thick, it is possible to reduce the weight of the tank.

While the preferred embodiment of the present invention has been described using specific terms, such description is for illustrative purposes only, and it is to be understood that changes and variations may be made without departing from the spirit or scope of the appended claims.

The invention claimed is:

1. A tank including an O-ring between a cylindrical mouth portion, which is formed in a resin liner forming a tank body which is to be filled with gas, and a ferrule member which is mounted on an inner peripheral side of the mouth portion, the tank comprising:

an insert ring which is fixed within the mouth portion with a resin which fills an inner peripheral side and the outer peripheral side of the insert ring so as to be substantially coaxial with a center axis of the mouth portion, the insert ring including a plurality of communication holes which allow the filled resin to flow between the inner peripheral side and an outer peripheral side of the insert ring.

2. A method of manufacturing a tank including an O-ring between a cylindrical mouth portion, which is formed in a resin liner forming a tank body which is to be filled with gas, and a ferrule member which is mounted on an inner peripheral side of the mouth portion, comprising:

insert-molding an insert ring such that the insert ring is fixed within the mouth portion with a resin which fills an inner peripheral side and an outer peripheral side of the insert ring so as to be substantially coaxial with a center axis of the mouth portion, the insert ring including a plurality of communication holes which allow the filled resin to flow between the inner peripheral side and an outer peripheral side of the insert ring.

3. The method of manufacturing a tank according to claim 2, wherein the insert ring is machined by press molding of a metal.

4. The method of manufacturing a tank according to claim 2, wherein the molding of the resin liner is injection molding.

* * * * *